(12) United States Patent
Srinivasan et al.

(10) Patent No.: US 9,116,735 B2
(45) Date of Patent: Aug. 25, 2015

(54) OFFLINE PROVISIONING OF VIRTUAL MACHINES

(75) Inventors: KY Srinivasan, Redmond, WA (US); Stephen Zarkos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 13/414,246

(22) Filed: Mar. 7, 2012

(65) Prior Publication Data

US 2013/0239106 A1 Sep. 12, 2013

(51) Int. Cl.
G06F 9/455 (2006.01)
G06F 9/44 (2006.01)
G06F 9/445 (2006.01)

(52) U.S. Cl.
CPC ........ *G06F 9/45558* (2013.01); *G06F 9/44505* (2013.01)

(58) Field of Classification Search
None
See application file for complete search history.

(56) References Cited

U.S. PATENT DOCUMENTS

| 8,103,776 | B2 | 1/2012 | DeHaan | |
|---|---|---|---|---|
| 8,201,732 | B1* | 6/2012 | Kropf et al. | 235/379 |
| 8,375,387 | B2* | 2/2013 | Hicks et al. | 718/100 |
| 8,495,512 | B1* | 7/2013 | Lappas et al. | 715/764 |
| 2006/0136720 | A1* | 6/2006 | Armstrong et al. | 713/164 |
| 2007/0006329 | A1* | 1/2007 | Morrow et al. | 726/34 |
| 2007/0300220 | A1 | 12/2007 | Seliger et al. | |
| 2009/0083404 | A1* | 3/2009 | Lenzmeier et al. | 709/221 |
| 2009/0089781 | A1* | 4/2009 | Shingai et al. | 718/1 |
| 2009/0300609 | A1 | 12/2009 | Hicks et al. | |
| 2010/0058336 | A1* | 3/2010 | Louzoun et al. | 718/1 |
| 2010/0235831 | A1* | 9/2010 | Dittmer | 718/1 |
| 2010/0242038 | A1 | 9/2010 | Berrange et al. | |
| 2010/0293544 | A1 | 11/2010 | Wilson et al. | |
| 2010/0306764 | A1* | 12/2010 | Khanna | 718/1 |
| 2011/0055712 | A1 | 3/2011 | Tung et al. | |
| 2011/0138384 | A1 | 6/2011 | Bozek et al. | |
| 2011/0179132 | A1 | 7/2011 | Mayo et al. | |
| 2011/0191834 | A1* | 8/2011 | Singh et al. | 726/6 |
| 2011/0213765 | A1* | 9/2011 | Cui et al. | 707/711 |
| 2011/0265076 | A1* | 10/2011 | Thorat et al. | 717/172 |
| 2012/0005672 | A1* | 1/2012 | Cervantes et al. | 718/1 |
| 2012/0131577 | A1* | 5/2012 | Arcese et al. | 718/1 |

(Continued)

OTHER PUBLICATIONS

Zhou et al. "Always Up-to-date—Scalable Offline Patching of VM Images in a Compute Cloud". ACSAC ACM. Dec. 2010.*

(Continued)

*Primary Examiner* — Adam Lee
(74) *Attorney, Agent, or Firm* — Henry Gabryjelski; Kate Drakos; Micky Minhas

(57) ABSTRACT

An offline provisioning system provides a facility for provisioning a virtual machine without requiring that the virtual machine be launched. The system extends the configuration file or other mechanism used for storing virtual hardware configuration to store provisioning information for software state. The system uses the configuration information for pushing selective contents of the configuration information into the guest virtual machine as it is launched to perform guest provisioning. With these changes in place, a guest virtual machine can be provisioned when the virtual machine image is offline and not running. The system can even perform provisioning before an appropriate host has been identified to launch the guest virtual machine. This allows for much more rapid deployment and provisioning of virtual machines and frees administrative resources for other tasks.

19 Claims, 4 Drawing Sheets

(56) References Cited

U.S. PATENT DOCUMENTS

2012/0151477 A1* 6/2012 Sinha et al. .................. 718/1
2012/0304170 A1* 11/2012 Morgan ....................... 718/1
2013/0014102 A1* 1/2013 Shah ............................ 718/1
2013/0191826 A1* 7/2013 Heninger et al. ............ 718/1

OTHER PUBLICATIONS

"International Search Report", Mailed Date: Jun. 27, 2013, Application No. PCT/US2013/026960, Filed Date: Feb. 20, 2013, pp. 9.

"Introduction to Provisioners in Vagrant.", Retrieved at <<http://vagrantup.com/docs/provisioners/introduction.html>>, Retrieved Date: Feb. 8, 2012, pp. 2.

"What's New in VMware vCloud™ Director 1.5.", Retrieved at <<http://www.vmware.com/files/pdf/techpaper/Whats-New-VMware-vCloud-Director-15-Technical-Whitepaper.pdf>>, Technical White Paper, Retrieved Date: Feb. 8, 2012, pp. 1-14.

* cited by examiner

OFFLINE PROVISIONING OF VIRTUAL MACHINES

BACKGROUND

Virtual machines are software concepts that provide a layer between an operating system and applications and physical computing resources. The software emulates the qualities of a target physical hardware platform so that an operating system and applications running on the virtual machine act as if they are executing on a physical machine with the emulated qualities. The actual physical computing resources may be used to execute many virtual machines at the same time. In many cases, a hypervisor is used to manage the resources of the physical machine and to start one or more virtual machines running on the physical machine. Virtual machines can often be paused, moved to another physical machine, and resumed, all with little or no interruption to the operating system and applications running on the virtual machine. Thus, virtual machines have become a great tool for datacenters, particularly those hosting multiple tenants (e.g., application service providers, and the like). The manager of the datacenter need only ensure that each virtual machine has the resources that it needs, rather than managing the actual software running on the virtual machine.

Appliances, especially virtual appliances where a specific application along with the necessary operating environment is packaged as a single deployable image, have become a popular distribution format for software vendors. Before this appliance image can be deployed, the image needs to be customized and this operation is typically referred to as provisioning. Several aspects of the appliance will typically need to be customized: 1) hardware resources to be allocated to the virtual machine, and 2) injecting state into the virtual machine to provision the virtual machine. State may include information such as user accounts/passwords, secure shell (SSH) keys, network configuration (e.g., Internet Protocol (IP) addresses, domain name, and so on), and so forth. Because each virtual machine will use a different IP address, host name, and so forth, simply cloning the virtual machine image is insufficient to provision the virtual machine and prepare it for use.

While the hardware customization can be done without launching the virtual machine, most schemes currently in use require the virtual machine to be running to inject state into the virtual machine. For instance, MICROSOFT™ WINDOWS™ uses a tool called sysprep to automate the customization. Sysprep can only run while the virtual machine is running and thus an administrator first sets up the hardware customization and launches the virtual machine, then runs sysprep on each one to complete provisioning. If the administrator is provisioning many (e.g., hundreds or thousands) of virtual machines, then provisioning very quickly becomes a tedious and time-consuming task. Other mechanisms in use include "first boot configuration". In all these schemes, the virtual machine needs to be executing to perform the final provisioning/customization.

SUMMARY

An offline provisioning system is described herein that provides a facility for provisioning a virtual machine without requiring that the virtual machine be launched just to provision. As noted earlier, presently all of the hardware provisioning can be done without launching the virtual machine since the hardware provisioning information is part of the configuration file describing the virtual machine. The offline provisioning system extends the configuration file or other mechanism used for storing virtual hardware configuration to store provisioning information for software state. The offline provisioning system uses the configuration information for pushing selective contents of the configuration information (those pertaining to guest provisioning) into the guest virtual machine as it is launched to perform guest provisioning. With these changes in place, a guest virtual machine can be provisioned when the virtual machine image is offline and not running. Since the provisioning information is added to the virtual machine configuration file, the system can even perform provisioning before an appropriate host has been identified to launch the guest virtual machine. This allows for much more rapid deployment and provisioning of virtual machines and frees administrative resources for other tasks. Thus, the offline provisioning system simplifies provisioning of virtual machines by allowing the information needed for provisioning to be collected and stored before the virtual machine has been run, and then to be applied without administrative oversight upon use of the virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
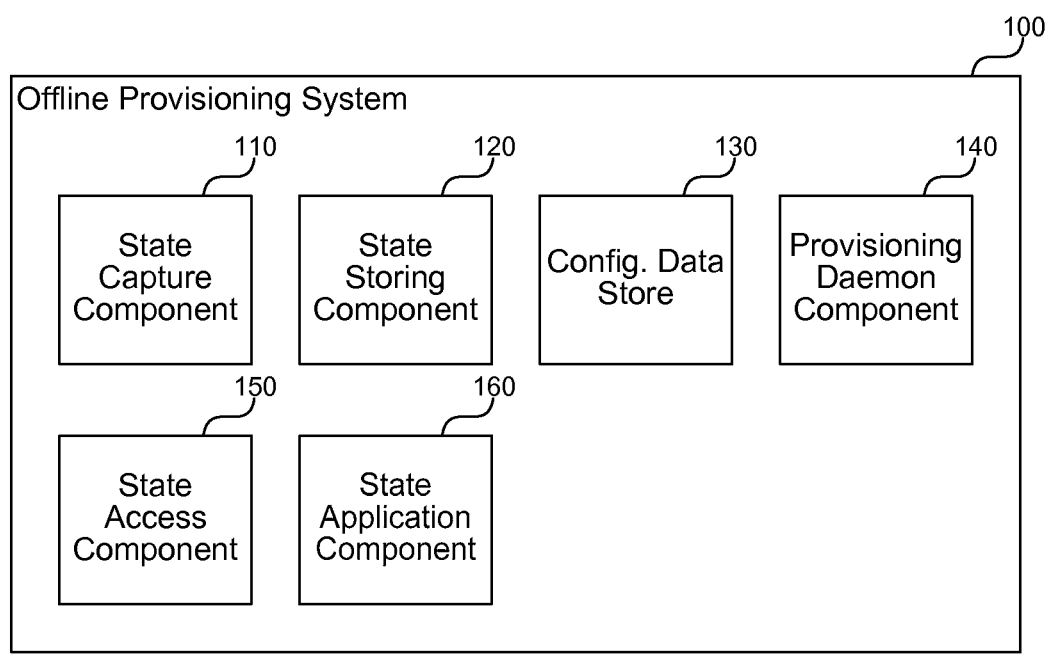
FIG. 1 is a block diagram that illustrates components of the offline provisioning system, in one embodiment.

An offline provisioning system is described herein that provides a facility for provisioning a virtual machine without requiring that the virtual machine be launched just to provision. As noted earlier, presently all of the hardware provisioning can be done without launching the virtual machine since the hardware provisioning information is part of the configuration file describing the virtual machine. The offline provisioning system extends the configuration file or other mechanism to store provisioning information. Typically, the contents of the configuration information will be consumed by the virtualization platform to launch the virtual machine. The offline provisioning system also uses the configuration information for pushing selective contents of the configuration information (those pertaining to guest provisioning) into the guest virtual machine as it is launched to perform the necessary guest provisioning. With these changes in place, a guest virtual machine can be provisioned when the virtual machine image is offline and not running. Since the provisioning information is added to the virtual machine configuration file, the system can even perform provisioning before an appropriate host has been identified to launch the guest virtual machine. This allows for much more rapid deployment and provisioning of virtual machines and frees administrative resources for other tasks.

The offline provisioning system can be used in conjunction with any operating system running on the guest virtual machine. In the case of WINDOWS™, MICROSOFT's™ virtualization platform has implemented a generic mechanism for exchanging key/value tuples with the guest virtual machines hosted on the platform. If the guest is currently not executing, the key/value tuples will be added to the configuration document associated with the virtual machine and when the virtual machine is launched these cached key/value tuples will be injected into the guest. For Linux virtual machines that currently do not have a sysprep-like tool for provisioning, the offline provisioning system provides a registry-like configuration data store infrastructure using the key/value pair mechanism. A daemon running in the guest and provided as part of the guest image can extract these key/value tuples and perform arbitrary customization of the guest virtual machine when the guest is launched. With this infrastructure, the system can perform virtual machine provisioning without having to launch the virtual machine on Linux and other platforms. The key/value scheme allows for various customization and exchange of any type of data for provisioning the guest virtual machine. Thus, the offline provisioning system simplifies provisioning of virtual machines by allowing the information needed for provisioning to be collected and stored before the virtual machine has been run, and then to be applied without administrative oversight upon use of the virtual machine.

The key/value tuple mechanism provided by MICROSOFT™ Hyper-V allows a guest operating system to get information from a host operating system running the guest in a virtual machine. This information may include the WINDOWS™ version, real IP addresses, processor information, memory configuration, hardware resources, and so forth. A service running on the guest passes key/value tuples back and forth using a communication channel (e.g., a socket, named pipe, or other mechanism). In WINDOWS™, these key/value tuples show up as entries in the system registry, where applications or other software can access them. The offline provisioning system extends this mechanism to other operating systems, such as Linux, by providing a kernel driver or a user level daemon running within the Linux guest that opens a similar communication channel, receives provisioning information stored in a configuration file or other facility, and applies the provisioning information to affect state of the virtual machine and guest. Thus, with a single mechanism, an administrator can specify provisioning information without the virtual machine running, and that provisioning information will be applied to the virtual machine regardless of the particular operating system that the virtual machine is configured to run.

FIG. 1 is a block diagram that illustrates components of the offline provisioning system, in one embodiment. The system 100 includes a state capture component 110, a state storing component 120, a configuration data store 130, a provisioning daemon component 140, a state access component 150, and a state application component 160. Each of these components is described in further detail herein.

The state capture component 110 receives state information related to the operation of a virtual machine from an administrator to provision the virtual machine for a particular role. The state information may include network configuration, user names, domain information, or any other type of data relevant for preparing the virtual machine for operation in a particular capacity. The state information may include information that is specific to a particular virtual machine, such that the information cannot be provided in a cloned virtual machine image used to set up multiple virtual machines. In some cases, the state capture component 110 may capture general configuration information for multiple virtual machines and specific configuration information for each virtual machine. The system 100 may provide a user interface or tool for collecting the state information, such as a desktop or mobile application, web-based interface, programmatic interface, and so forth. The state capture component 110 may leverage existing configuration facilities such as MICROSOFT™ WINDOWS™ POWERSHELL™, by providing an extension module (e.g., cmdlets) or other software for integrating with the facilities to capture virtual machine state information.

The state storing component 120 stores received state information in the configuration data store 130. The state storing component 120 may include one or more file system application programming interfaces (APIs), database APIs, network communication channels, and so on. In some cases, the system 100 may maintain the configuration data store 130 as a repository that is centrally accessible within a datacenter or over a network. The state storing component 120 then communicates captured state information to the repository by a suitable communication channel (e.g., Transmission Control Protocol (TCP), remote storage of a file, writing the state information to a database, and so forth).

The configuration data store 130 persistently stores state information for one or more virtual machines. The configuration data store 130 may include one or more files, file systems, hard drives, databases, storage area networks (SANs), cloud-based storage services, or other facilities for storing data over time. In some cases, the system 100 may be used in a multi-tenant datacenter or cloud-computing environment to provision new virtual machines or appliances. In such cases, the configuration data store 130 may include a centrally accessible database that virtual machines communicate with to access previously captured and stored provisioning information. The configuration information stored by the configuration data store 130 can be stored on the host where the guest virtual machine will run, on a central server that provides a repository of guest provisioning information, or in any other location to which the guest will have access to the provisioning information.

The provisioning daemon component 140 operates within a guest virtual machine to retrieve state information captured and stored while the guest virtual machine was not running. The component 140 may continue to monitor or listen for new state information provided after the guest virtual machine is running. The component may operate as a service, daemon, or other software application that runs early in the boot process of an operating system running on the guest virtual machine, and that has suitable access for applying state information to the guest virtual machine. The component 140 may open a communication channel or transport for receiving configuration information related to provisioning, and may invoke one or more APIs provided by the host platform for accessing information outside of the guest virtual machine. The hypervisor or other software can provide specific instructions that a guest virtual machine can execute to "pierce the veil" of the virtual machine to reach data stored by the host, such as provisioning data. Because the provisioning data can be stored by an administrator much earlier, even before the virtual machine was deployed to a host, the provisioning daemon component 140 can operate to apply the provisioning data without direct oversight by the administrator.

The state access component 150 accesses state information previously stored in the configuration data store 130 from a guest virtual machine. The provisioning daemon component 140 invokes the state access component 150 to establish a communication channel suitable for accessing the received state information. The communication channel may access a file stored on the host, a file stored on a remote server, a database, a live channel such as a socket for receiving provisioning information, or any other transport over which provisioning data can be provided to the guest virtual machine. The state access component 150 may continue to listen for or to attempt to access new configuration data for as long as the guest virtual machine is in a running state.

The state application component 160 applies accessed state information to provision the guest virtual machine to operate in the particular role specified by the state information. The application of the state information serves to distinguish the virtual machine from other similar virtual machines. For example, the state information may assign the virtual machine substantially unique IP address, hostname, cryptographic keys, or other information that allows the virtual machine to operate as a distinguished computing device. Applying state may include invoking APIs of the operating system related to setting configuration settings, storing files on the guest virtual machine, modifying a configuration database (e.g., the WINDOWS™ registry), or other changes to the guest virtual machine to carry out the purpose of the state information. The state application component 160 may receive state information as one or more key/value tuples, and may look for specific key names to apply the values associated with those names. For example, the key/value tuples may include a "hostname" key name that specifies a value for naming the guest virtual machine on a network.

The computing device on which the offline provisioning system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
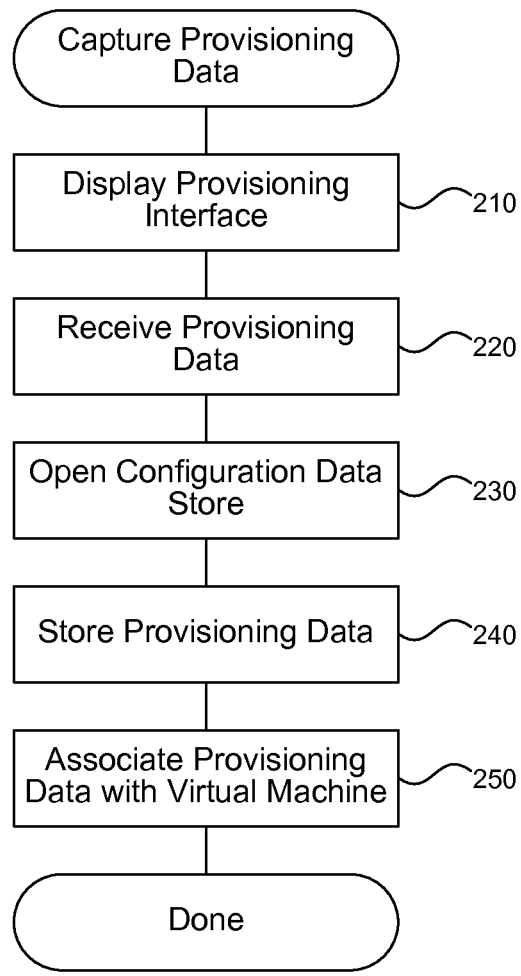
FIG. 2 is a flow diagram that illustrates processing of the offline provisioning system to capture provisioning information while a virtual machine is offline, in one embodiment.

FIG. 2 is a flow diagram that illustrates processing of the offline provisioning system to capture provisioning information while a virtual machine is offline, in one embodiment. Beginning in block 210, the system displays an interface for receiving provisioning data that configures the operation of a specific virtual machine, wherein the provisioning data includes at least some information unique to a specific instance of the virtual machine. The interface may include a displayed user interface of a software application, such as a graphical user interface (GUI) or console user interface (CUI), a programmatic interface accessed by a script, and so forth. The system may provide multiple interfaces through which administrators can provide provisioning information.

Continuing in block 220, the system receives provisioning data via the displayed interface. The system may receive provisioning data by the administrator storing the data to a file, by receiving the data locally or remotely over a networking connection (e.g., a socket), by the administrator invoking a programmatic API of the system, and so forth. The provisioning data may be in a particular predetermined format, such as key/value tuples, a hierarchical format (e.g., extensible markup language (XML)), or other format for providing provisioning data.

Continuing in block 230, the system opens a configuration data store for persistently storing the received provisioning data. Opening the configuration data store may include opening and/or creating one or more configuration data files, accessing a configuration database, opening a network connection to a local or remote server, accessing a cloud-based storage service, and so forth. In some cases, the system may select a file name or other identifier for the configuration data store based on the provisioning data and information related to the virtual machine associated with the configuration data.

Continuing in block 240, the system stores the received provisioning data in the opened configuration data store. If the configuration data store is a file, then the system writes the received provisioning data to the file. The system may write the data in any of a variety of formats, such as key/value tuples, hierarchical markup, and so on. If the configuration data store is a database, then the system writes the received provisioning data to particular tables and rows of the database. So long as the component that will access the provisioning data and the component storing the provisioning data agree on a particular format and location for the configuration data store, the provisioning data may be stored at any particular location and any particular format suitable for a particular implementation of the system. In some cases, the format and/or location are selected that is well suited to a particular guest operating system.

Continuing in block 250, the system associates the stored provisioning data with a particular guest virtual machine. Associating provisioning data may include naming a configuration data file according to a particular convention, setting information in a database, and so forth. At this point, the virtual machine may not yet have been run for the first time and may only exist as a configuration file that specifies particular hardware and other resources that the virtual machine will emulate. The associated provisioning data specifies additional configuration information for the virtual machine that may include hardware, software, or other state information that provisions the virtual machine to act in a particular role and to have a distinguishable identity from other virtual machines. Upon execution of the virtual machine, the system will apply the received provisioning information in a process like that described with reference to FIG. 3. After block 250, these steps conclude.

Figure 3:
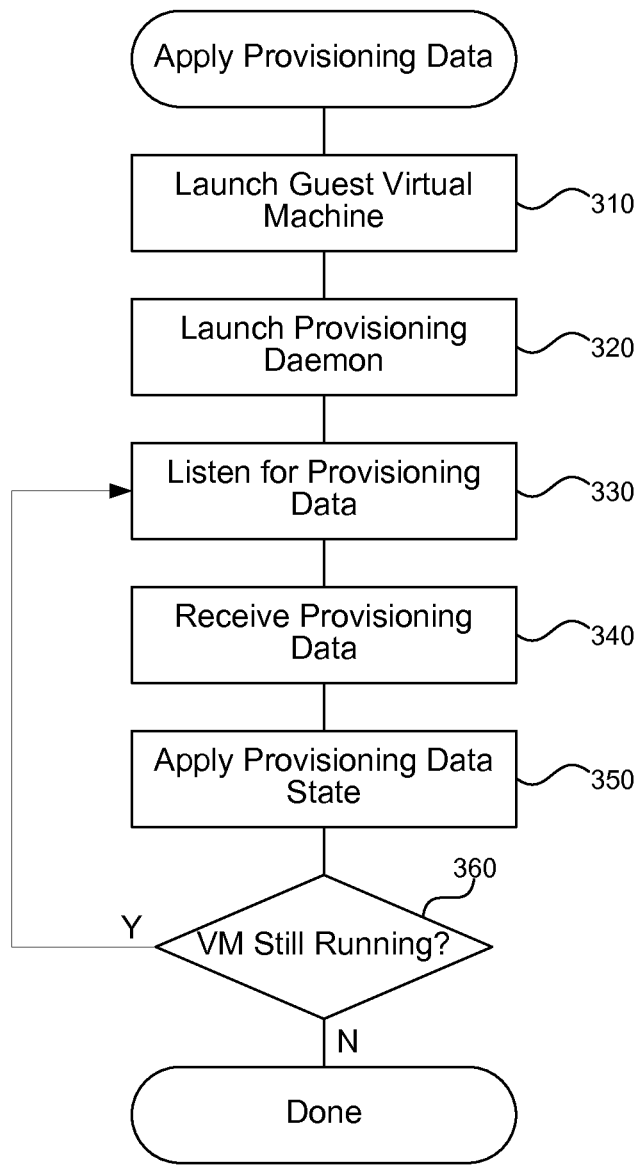
FIG. 3 is a flow diagram that illustrates processing of the offline provisioning system to apply previously received provisioning information to a virtual machine, in one embodiment.

FIG. 3 is a flow diagram that illustrates processing of the offline provisioning system to apply previously received provisioning information to a virtual machine, in one embodiment. Beginning in block 310, the system launches a guest virtual machine to execute on a host operating system and associated hardware resources. The launch may be the first launch of the guest virtual machine or a subsequent launch. In many cases, the guest virtual machine will be running for the first time when the system performs the bulk of provisioning activity, though additional changes may be made and applied through the system over time by administrators. The administrator may launch the guest virtual machine through a virtual machine management user interface, via a script, or by another facility for launching virtual machines.

Continuing in block 320, the system launches a provisioning daemon running within the guest virtual machine that communicates between a configuration data store and the guest virtual machine. The provisioning daemon may run as an operating system service or daemon with low-level access to operating system configuration APIs so that received provisioning data can be applied to the guest virtual machine. The provisioning daemon may be provided as a preconfigured component of a virtual machine image, such that the daemon is configured to start automatically during initialization of the guest virtual machine and its associated guest operating system.

Continuing in block 330, the system listens for provisioning data on a communication channel opened by the provisioning daemon. The communication channel may include opening a file on the host, opening a remote configuration data store, opening a network socket or named pipe for accessing configuration information, and so forth. The system may immediately receive configuration data via the configuration channel and may listen on a continuous basis while the virtual machine is running to receive any modified provisioning data. The provisioning data configures the guest virtual machine to operate in a particular role and to distinguish the guest virtual machine from other virtual machines (e.g., by giving the guest virtual machine a unique host name, IP address, or other configuration).

Continuing in block 340, the system receives provisioning data via the communication channel that specifies information for configuring the guest virtual machine and at least one information item that distinguishes the guest virtual machine from other virtual machines. The system may receive the provisioning data by accessing one or more files, databases, cloud-based storage services, or other facilities for storing data. The provisioning data may be stored in a particular format that is understood by the provisioning daemon, such as hierarchically or as a set of key/value tuples.

Continuing in block 350, the system applies the received provisioning data to modify a software state of the guest virtual machine. Applying the provisioning data may include invoking one or more configuration APIs of the guest operating system, storing the provisioning data in a configuration database where the data can be retrieved by applications or operating system components, and so forth. The system may also stop and restart services that are affected by the modified software state to complete the application of the provisioning data.

Continuing in decision block 360, if the virtual machine is still running, then the system loops to block 330 to continue listening for provisioning data. Administrators may reconfigure various virtual machines over time and the system provides a mechanism that makes the application of such modifications straightforward. Upon termination of the virtual machine, the provisioning daemon is halted along with the guest virtual machine and the process concludes. After block 360, these steps conclude.

Figure 4:
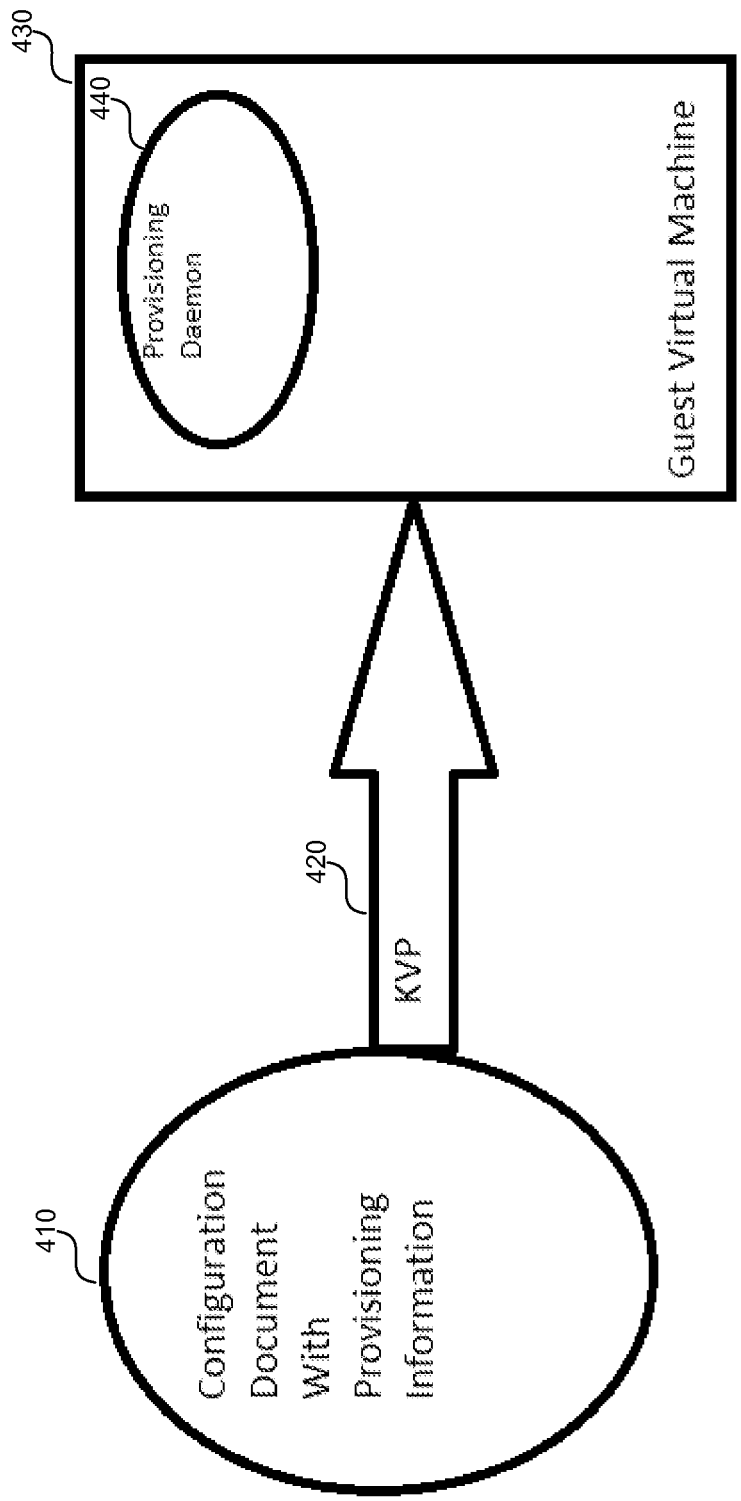
FIG. 4 is a block diagram that illustrates application of provisioning information to a virtual machine at a conceptual level using the offline provisioning system, in one embodiment.

FIG. 4 is a block diagram that illustrates application of provisioning information to a virtual machine at a conceptual level using the offline provisioning system, in one embodiment. An administrator places configuration information for provisioning the guest virtual machine 430 into a configuration document 410. This can occur at a time before the virtual machine has ever been run or even assigned to a host, or later when the virtual machine is already running to modify configuration information. The system communicates information in the configuration document 410 via the communication channel 420 to a guest virtual machine 430. The guest virtual machine 430 includes a provisioning daemon 440 that listens for provisioning data and applies the provisioning data by modifying the configuration of the guest virtual machine 430.

In some embodiments, the offline provisioning system is used to manage a cloud datacenter. The system allows the storage of a single "golden master" that represents a common virtual machine image with multiple specific configuration files to configure the golden master to act as any specific instance with particular provisioning information. An administrative tool allows administrators to launch new instances of the virtual machine by selecting and binding a specific configuration file to the golden master.

In some embodiments, the offline provisioning system allows for remote application of provisioning data. Due to the nature of the system and the ability to configure a virtual machine at a location that may be far removed from the host that will run the virtual machine, it is possible for administrators at one location to configure and manage virtual machines at another location. The administrators can perform provisioning at their own workstations and later transmit the provisioning data they produce to one or more datacenters to be applied to particular virtual machine instances. The administrators can also establish a communication channel with the running virtual machine to later modify configuration parameters of the virtual machine remotely.

In some embodiments, the offline provisioning system can be scripted with WINDOWS™ Management Interface (WMI), POWERSHELL™, Orchestrator, and other tools or their equivalents on non-WINDOWS™ operating systems to allow provisioning information to be specified programmatically. For example, if an administrator wants to create 50 virtual machines each having an IP address in a particular range, the administrator could write a script that stores provisioning data for each virtual machine, selecting an IP address from the specified range for each virtual machine, and storing the unique IP address for each virtual machine in its own provisioning data file.

Following is an example configuration document in XML format that is suitable for communication via MICROSOFT™ Hyper-V to a guest virtual machine. Key/value tuples are cached on the Hyper-V host side before they are sent to the server.

```
<?xml version="1.0" encoding="UTF-16" standalone="yes"?>
<configuration>
    <_2a34b1c2-fd73-4043-8a5b-dd2159bc743f_>
        <kvp>
            <key type="string">ExampleKVPKey1</key>
            <value type="string">ExampleKVPValue1</value>
        </kvp>
```

-continued

```
    <kvp>
        <key type="string">ExampleKVPKey2</key>
        <value type="string">ExampleKVPValue2</value>
    </kvp>
</_2a34b1c2-fd73-4043-8a5b-dd2159bc743f_>
</configuration>
```

The following is an example POWERSHELL™ script that pushes specific key/value tuples to a guest virtual machine, which are then consumed by an agent running on the guest virtual machine.

```
#%powershell1.0%
$VARS = @( "Interface", "IPAddress", "Netmask", "Gateway",
"DHCPHostname", "Hostname", "Search", "Nameservers", "Username",
"Password", "PubKey", "FlushInterface", "RestartNetwork",
"LOCKConfig" )
$SERVER = "localhost"
$virtual machine = "VM Name"
$Interface = "eth0"
$IPAddress = "1.1.1.2"
$Netmask = "255.255.255.0"
$Gateway = "1.1.1.1"
$DHCPHostname = ""
$Hostname = "SampleHostname"
$Search = "contoso.com"
$Nameservers = "1.1.1.254"
$Username = "testuser"
$Password = "password"
$PubKey = "" ## SSH Key
$FlushInterface = 1
$RestartNetwork = 1
Description: Set a KVP value using WMI
opt = 0, AddKVPItems
opt = 1, ModifyKVPItems
opt = 2 , RemoveKVPItems
function SetKVPValue( $key="", $value="", $opt=0 ) {
    if ( $key -eq "" ) {
        return $false
    }
    if ( $opt -eq 2 ) {
        $value = ""
    }
    $virtual machineManagementService = Get-WmiObject -class
"Msvm_Virtual SystemManagementService" -namespace
"root\virtualization"
-ComputerName $SERVER
    $virtual machineGuest = Get-WmiObject -Namespace
root\virtualization -ComputerName $SERVER -Query "Select * From
Msvm_ComputerSystem Where ElementName='$virtual machine'"
    $Msvm_KvpExchangeDataItemPath =
"\\$SERVER\root\virtualization:Msvm_KvpExchangeDataItem"
    $Msvm_KvpExchangeDataItem =
([WmiClass]$Msvm_KvpExchangeDataItemPath).CreateInstance( )
    $Msvm_KvpExchangeDataItem.Source = 0
    $Msvm_KvpExchangeDataItem.Name = "CONFD_$key"
    $Msvm_KvpExchangeDataItem.Data = "$value"
    if ( $opt -eq 0 ) {
        $virtual machineManagementService.AddKvpItems($virtual
machineGuest, $Msvm_KvpExchangeDataItem.PSBase.GetText(1))
    }
    elseif ( $opt -eq 1 ) {
        $virtual machineManagementService.ModifyKvpItems($virtual
machineGuest, $Msvm_KvpExchangeDataItem.PSBase.GetText(1))
    }
    elseif ( $opt -eq 2 ) {
        $virtual machineManagementService.RemoveKvpItems($virtual
machineGuest, $Msvm_KvpExchangeDataItem.PSBase.GetText(1))
    }
    else { return $false }
}
foreach ( $var in $VARS ) {
    [string]$value = (get-variable (get-variable var).value).value
    SetKVPValue $var $false 2
    SetKVPValue $var $value 0
}
```

From the foregoing, it will be appreciated that specific embodiments of the offline provisioning system have been described herein for purposes of illustration, but that various modifications may be made without deviating from the spirit and scope of the invention. Accordingly, the invention is not limited except as by the appended claims.

We claim:

1. A computer-implemented method to capture provisioning information while a virtual machine is off, the method comprising:
   displaying an interface for receiving provisioning data that configures the operation of the virtual machine, wherein the provisioning data includes at least some information unique to a specific instance of the virtual machine;
   receiving provisioning data via the displayed interface;
   opening a configuration data store for persistently storing the received provisioning data;
   storing the received provisioning data in the opened configuration data store, wherein the provisioning data is located outside of the instance of the virtual machine; and
   associating the stored provisioning data with the instance of the virtual machine, wherein the instance of the virtual machine includes a provisioning daemon operating within the instance of the virtual machine;
   providing the received provisioning data to the provisioning daemon operating within the instance of the virtual machine; and
   applying by the provisioning daemon the received provisioning information to configure the instance of the virtual machine;
   wherein the preceding steps are performed while the instance of the virtual machine is off.

2. The method of claim 1 wherein displaying the interface comprises providing at least one of a graphical user interface (GUI), a console user interface (GUI), or a programmatic interface.

3. The method of claim 1 wherein receiving provisioning data comprises receiving provisioning data by the administrator storing the data to a configuration file.

4. The method of claim 1 wherein receiving provisioning data comprises receiving provisioning data from a computer system remote from the virtual machine.

5. The method of claim 1 wherein receiving provisioning data comprises receiving provisioning data in a particular predetermined format that includes key/value tuples.

6. The method of claim 1 wherein opening the configuration data store comprises opening or creating one or more configuration data files.

7. The method of claim 1 wherein opening the configuration data store comprises accessing a configuration database.

8. The method of claim 1 wherein opening the configuration data store comprises selecting an identifier for the configuration data store based on the provisioning data and information related to the virtual machine associated with the configuration data.

9. The method of claim 1 wherein storing the provisioning data comprises a particular format and location for the configuration data store that matches a format and location consumed by a provisioning daemon configured to run on the virtual machine.

10. The method of claim 1 wherein storing the provisioning data comprises storing the provisioning data while the virtual machine is off and before the virtual machine has ever run.

11. The method of claim 1 wherein associating provisioning data includes naming a configuration data file according to a particular convention that identifies the particular virtual machine.

12. The method of claim 1 wherein the associated provisioning data specifies configuration information for the virtual machine that may include hardware, software, or other state information that provisions the virtual machine to act in a particular role and to have a distinguishable identity from other virtual machines.

13. A computer system for offline provisioning of virtual machines, the system comprising:
- a processor and memory configured to execute software instructions embodied within the following components;
- a state capture component that receives state information related to the operation of a virtual machine from an administrator to provision the virtual machine for a particular role;
- a configuration data store that persistently stores state information for one or more virtual machines outside of the one or more virtual machines;
- a state storing component that stores received state information in the configuration data store;
- a provisioning daemon component that operates within the virtual machine to retrieve state information captured and stored in the configuration data store;
- a state access component that accesses state information previously stored in the configuration data store from the virtual machine;
- a state application component that applies accessed state information to provision the virtual machine to operate in the particular role specified by the state information, wherein the preceding steps are performed while the virtual machine is off.

14. The system of claim 13 wherein the state capture component provides a scripting interface through which an administrator can provide provisioning data via a script.

15. The system of claim 13 wherein the configuration data store is a server in a multi-tenant datacenter or cloud computing environment that stores information to provision new virtual machines or appliances.

16. The system of claim 13 wherein the configuration data store is a repository that is centrally accessible over a network and the state storing component communicates captured state information to the repository by a communication channel.

17. The system of claim 13 wherein the provisioning daemon component continues to monitor for new state information provided after the virtual machine is running.

18. The system of claim 13 wherein the provisioning daemon component operates as a service, daemon, or other software application that runs early in the boot process of an operating system running on the virtual machine, and that has suitable access for applying state information to the virtual machine.

19. A computer-readable storage hardware device comprising instructions for controlling a computer system to apply previously received provisioning information to a virtual machine, wherein the instructions, upon execution, cause a processor to perform actions comprising:
- launching the virtual machine to execute on a host operating system and associated hardware resources;
- launching a provisioning daemon running within the virtual machine that communicates between a configuration data store and the virtual machine, wherein the configuration data store is external from the virtual machine;
- listening for provisioning data on a communication channel opened by the provisioning daemon;
- receiving provisioning data via the communication channel that specifies information for configuring the virtual machine and at least one information item that distinguishes the virtual machine from other virtual machines;
- applying the received provisioning data to modify a software state of the virtual machine without interacting with an administrator, wherein the preceding steps are performed while the virtual machine is off.

* * * * *